United States Patent [19]

Cesaroni

[11] Patent Number: 5,039,370
[45] Date of Patent: Aug. 13, 1991

[54] HEAT SEALING OF POLYAMIDES

[76] Inventor: Anthony J. Cesaroni, 39 Davisbrooke Dr., Agincourt, Ont., Canada, M1T 2H6

[21] Appl. No.: 478,679

[22] Filed: Feb. 12, 1990

Related U.S. Application Data

[62] Division of Ser. No. 178,385, Apr. 6, 1988, Pat. No. 4,935,462.

[30] Foreign Application Priority Data

Apr. 8, 1987 [GB] United Kingdom ............... 8708386

[51] Int. Cl.⁵ .................................................. C09J 5/00
[52] U.S. Cl. .................................... 156/326; 106/311; 156/308.6; 156/330.9; 156/331.8; 252/364; 428/474.7; 428/474.9; 524/323; 524/334; 524/345
[58] Field of Search ............... 156/330.9, 331.8, 308.6, 156/326; 428/474.7, 474.9; 524/323, 345, 334; 252/364; 106/311

[56] References Cited

U.S. PATENT DOCUMENTS

| | | | |
|---|---|---|---|
| 3,335,042 | 8/1967 | Irwin | 156/308.6 |
| 3,423,292 | 1/1969 | Nichols | 202/169 |
| 3,449,273 | 6/1969 | Kettenring et al. | 260/18 |

FOREIGN PATENT DOCUMENTS

| | | | |
|---|---|---|---|
| 141275 | 2/1948 | Australia | 428/474.9 |
| 1102941 | 3/1961 | Fed. Rep. of Germany . | |
| 2156445 | 5/1973 | Fed. Rep. of Germany . | |
| 877598 | 12/1942 | France . | |
| 72038533 | 9/1972 | Japan . | |
| 55-145737 | 4/1979 | Japan . | |
| 70005395 | 2/1990 | Japan . | |
| WO83/03832 | 11/1983 | PCT Int'l Appl. . | |
| WO83/03835 | 11/1983 | PCT Int'l Appl. . | |
| 570649 | 7/1945 | United Kingdom . | |
| 634422 | 10/1950 | United Kingdom . | |
| 748607 | 5/1953 | United Kingdom . | |

OTHER PUBLICATIONS

Chemical Abstracts, vol. 101, p. 24, Part 12, Published Sep. 17, 1984 (Columbus, Ohio).

*Primary Examiner*—John J. Gallagher

[57] ABSTRACT

A mixture of benzyl alcohol and a hydroxy benzene is disclosed, for use in the bonding together of polyamide articles. In one embodiment, the mixture comprises 5 to 50% by weight of benzyl alcohol, 20 to 90% by weight of phenol; and 5 to 30% by weight of polyamide. In another embodiment, the mixture comprises 20 to 60% by weight of a benzyl alcohol, 20 to 60% by weight of ortho-dihydroxy benzene and 20 to 60% by weight of a lower alcohol having one to four carbon atoms. The mixture may be applied to a polyamide article, which may then be contacted with a second polyamide article and heated to effect bonding. In another embodiment, a pattern of the mixture may be applied, for instance on a polyamide film, the pattern corresponding to the bonds required in the polyamide article being manufactured. For example, the composition may be used to bond film or sheet together so as to form fluid flow passages therebetween e.g. as in a heat exchanger.

11 Claims, No Drawings

HEAT SEALING OF POLYAMIDES

This is a division of application Ser. No. 07/178,385, filed Apr.6, 1988, now U.S. Pat. No. 4,935,462.

The present invention relates to the heat sealing of polyamides, and especially to a composition that may be used to facilitate the bonding of polyamides using heat sealing techniques.

Polyamides are widely used in a variety of forms, including fibres, moulded articles, films and sheets. Techniques have been developed for the bonding of polyamides, especially the bonding of films and sheets to form laminates, containers, hollow articles or the like. Such techniques include the use of adhesive compositions and heat sealing processes.

Polyamides tend to be difficult to seal using heat sealing techniques as the melt viscosity of such polymers tends to decrease very rapidly as the temperature of the polyamide is increased above the melting point of the polyamide. That is in contrast to many other polymers e.g. polyethylene, which exhibit a relatively gradual reduction in melt viscosity as the temperature is increased above the melting point of the polymer. The rapid change of melt viscosity of polyamides with temperature may result, for example, in the formation of heat seals that are brittle due to loss of crystallinity and/or thinning of the film or sheet adjacent to the heat seal. Consequently, in the bonding of polyamides using heat sealing techniques, the heat sealing conditions must be carefully controlled in order to obtain commercially-acceptable heat seals, and such control is not always practical or even possible.

It is known to use polyurethane and related compositions in the bonding of polyamide articles. In addition, Japanese Patent 70 005 395B of Nippon Rayon KK, published 1970 Feb. 23, discloses a composition intended for use in the bonding of polyamide films, which comprises a solution of 25-35% by weight of resorcinol and 3.5-5.5% by weight of nylon 8 (polyaminooctanoic acid) dissolved in methanol. Polyamide films e.g. polycaprolactam, may be bonded at 10°-40° C. using the adhesive composition.

A bonding agent intended for use in the bonding of cloth and comprised of a polyamide dissolved in a solution of phenol or cresol mixed with 1,2-dichloroethane and formic acid is disclosed in Japanese Patent 72 038 533B of Central Glass Co. Ltd., published 1972 September 29. A hot melt adhesive comprised of 70-95% by weight of a polymeric fatty acid polyamide having a softening point of 80°-200° C. and 5-30% by weight of at least one of alpha-naphthol, beta-naphthol, phenol, resorcinol, hydroquinone, pyrogallol, p-hydroxyethylbenzoate and 4,4'-dihydroxydiphenyl is disclosed in U.S. Pat. No. 3 449 273 of 0. Kettenring et al, which issued 1969 June 10.

It has now been found that homogeneous admixtures of benzyl alcohol and hydroxy benzenes may be used to facilitate the bonding of polyamides using heat sealing techniques.

Accordingly, the present invention provides admixtures formed from benzyl alcohol and a hydroxy benzene, said admixtures being selected from the group consisting of:

(i) a homogeneous admixture consisting essentially of:
(a) 5 to 50% by weight of benzyl alcohol;
(b) 20 to 90% by weight of phenol; and
(c) 5 to 30% by weight of a polyamide; and (ii) a homogeneous admixture consisting essentially of:
(a) 20 to 60% by weight of benzyl alcohol;
(b) 20 to 60% by weight of ortho-dihydroxy benzene; and
(c) 20 to 60% by weight of a lower alcohol having from one to four carbon atoms.

The present invention also provides a process for bonding a first polyamide article to a second polyamide article, comprising:

(A) applying a homogeneous admixture formed from benzyl alcohol and a hydroxy benzene to at least one of said polyamide articles, said admixture being selected from the group consisting of:

(i) a homogeneous admixture consisting essentially of:
(a) 5 to 50% by weight of benzyl alcohol;
(b) 20 to 90% by weight of phenol; and
(c) 5 to 30% by weight of a polyamide; and (ii) a homogeneous admixture consisting essentially of:
(a) 20 to 60% by weight of benzyl alcohol;
(b) 20 to 60% by weight of ortho-dihydroxy benzene; and
(c) 20 to 60% by weight of a lower alcohol having from one to four carbon atoms; and (B) bringing said first and second polyamide articles into contact.

In a preferred embodiment of the process of the present invention, step (ii) of the process is followed by the step of (iii) applying heat to said articles to effect bonding of the first polyamide article to the second polyamide article, the amount of heat being insufficient to raise the temperature to more than the melting point of the polyamide.

In a further embodiment of the process of the present invention, the polyamide articles are in the form of film or sheet.

It is preferred that the polyamide of the benzyl alcohol/hydroxy benzene composition containing polyamide be an aliphatic polyamide.

The present invention relates to compositions in the form of homogeneous admixtures that are useful in the sealing of a first polyamide article to a second polyamide article. The compositions comprise benzyl alcohol and a hydroxy benzene viz. phenol or ortho-hydroxy benzene, the latter also being known as catechol or pyrocatechol. In one embodiment, the composition consists essentially of benzyl alcohol, phenol and a polyamide, especially an aliphatic polyamide. Such composition contains 5 to 50, preferably 10 to 40, per cent by weight of benzyl alcohol, 20 to 90, preferably 40 to 80, percent by weight of phenol and 5 to 30, preferably 10 to 20, percent by weight of the polyamide, although other combinations may be useful. In another embodiment, the composition consists essentially of benzyl alcohol, ortho-hydroxy benzene and a lower alcohol. Such composition contains 20 to 60, preferably 25 to 50, per cent by weight of benzyl alcohol, 20 to 60, preferably 25 to 50, percent by weight of ortho-hydroxy benzene and 20 to 60, preferably 25 to 50, percent by weight of a lower alcohol. The lower alcohol has one to four carbon atoms e.g. methanol, ethanol, propanol and butanol. Methanol is preferred.

The polyamide of the composition, where present, and the polyamide of the process is preferably an aliphatic polyamide. Examples of such polyamides are the polyamides formed by the condensation polymerization of an aliphatic dicarboxylic acid having 6-12 carbon atoms with an aliphatic primary diamine having 6-12 carbon atoms. Alternatively, the polyamide may be formed by condensation polymerization of an aliphatic lactam or alpha, omega aminocarboxylic acid having 6-12 carbon atoms. In addition, the polyamide may be formed by copolymerization of mixtures of such dicarboxylic acids, diamines, lactams and aminocarboxylic acids.

Examples of dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid) and 1,12-dodecanedioic acid. Examples of diamines are 1,6-hexamethylene diamine, 1,8-octamethylene diamine, 1,10-decamethylene diamine and 1,12-dodecamethylene diamine. An example of a lactam is caprolactam. Examples of alpha,omega aminocarboxylic acids are amino octanoic acid, amino decanoic acid and amino dodecanoic acid.

Preferred examples of the polyamides are polyhexamethylene adipamide and polycaprolactam, which are also known as nylon 66 and nylon 6, respectively. In other embodiments, the polyamide is a so-called amorphous polyamide, or a blend of amorphous polyamide and one or more polyamides as described above.

If the composition contains a polyamide, it is preferred that the polyamide of the composition be the same as or similar in structure to the polyamide that is to be bonded using the composition of the invention.

The compositions may be manufactured by admixing the composition and then, preferably, warming the admixture e.g. to a temperature in the range of about 18° to 125° C. especially 40° to 100° C. for a period of time e.g. one to 20 minutes to form a homogeneous admixture. The admixture is then permitted to cool. It is preferred that the admixture be stirred during the heating and cooling of the admixture. The composition is preferably such that the resultant admixture is homogeneous, especially in the cooled condition, in order that uniform properties may be obtained on use of the composition. In embodiments, the homogeneous admixture obtained is a viscous liquid, especially a liquid that may be coated onto substrates.

In use in the bonding of polyamide articles, the homogeneous admixture is coated onto one, or both, of the polyamide articles that are to be sealed together. For convenience, it is preferred that only one of the polyamide articles be coated. The polyamide articles are preferably in the form of film, sheet or moulded articles.

The coated polyamide article is brought into contact with the polyamide article to which it is to be bonded and then heated. It will usually be most convenient to heat the polyamide articles using a heat sealer. The polyamide articles should not be heated to a temperature above the melting point of the polyamide and is preferably at least 50° C. below the melting point of the polyamide. Examples of temperatures for use with polyhexamethylene adipamide are 18° to 200° C., especially 40° to 195° C. In the embodiment in which the polyamide articles are in the form of film or sheet and the heating means is a heat sealer adapted to heat the polyamide to a temperature close to the melting point of the polyamide, then the period of the heating may be short e.g. 1-5 seconds.

The present invention may be used in the bonding of polyamide articles, so as to form containers, conduits, laminated articles especially articles laminated only in part, and the like. The bonds obtained according to the present invention are superior to the bonds obtained using benzyl alcohol and/or phenol as the bonding agent.

The present invention is illustrated by the following examples:

EXAMPLE I 2 g of benzyl alcohol were admixed with 10 g of phenol and heated to 100° C. A polyamide (polyhexamethylene adipamide), 2 g, in flake form was then added to the admixture and stirred until the polyamide had dissolved. The resultant homogeneous admixture was then cooled to ambient temperature; the admixture obtained appeared to be homogeneous and had a viscosity similar to liquid honey.

The admixture was coated onto a polyamide (polyhexamethylene adipamide) in the form of film and then contacted with a similar, uncoated, polyamide film. The resultant film combination was placed in a platen press at a temperature that varied between 120° and 190° C.

The laminate obtained was cooled and then tested. It was found that a strong bond had been formed between the films.

EXAMPLE II 50g of ortho-dihydroxy benzene i.e. catechol, were admixed with 50g of benzyl alcohol and heated to 100° C. After a homogeneous admixture had been obtained, the admixture was cooled to 60°-70° C. and 25g of methanol were mixed into the admixture.

The resultant admixture was coated onto two sheets of polyhexamethylene adipamide, each sheet being approximately 0.5mm in thickness. One sheet was coated with a relatively thick coating of the admixture and the other sheet was coated with a relatively thin coating. The two sheets were brought into face-to-face contact between two moulds in a press at about 190° C. The moulds were intended for use in the manufacture of panel heat exchangers from thermoplastic polymers, and thus had grooves corresponding to fluid-flow passages in the panel heat exchanger. While the sheets were still between the moulds in the press, nitrogen was applied under pressure between the sheets, with some purging, so as to cause the sections of the sheets adjacent to a groove to expand into the groove, and thereby form fluid-flow passages of the panel heat exchanger. The panel heat exchanger was then withdrawn from the press; the sheets were in the press for approximately 45 seconds.

Attempts to pull the sheets apart by hand were unsuccessful, indicating that a bond of high peel strength had been obtained.

EXAMPLE III

In the comparative experiments, attempts were made to bond sheets of polyhexamethylene adipamide together, under the influence of both heat and pressure, using mixtures formed from the following components:
B: t-butanol, benzyl alcohol and methanol
C: hydroquinone, benzyl alcohol and isopropanol
D: t-butanol, benzyl alcohol and isopropanol
E: cyclohexanol and benzyl alcohol
F: phenol, cyclohexanol and benzyl alcohol
G: phenol and ethanol
H: catechol, methanol and ethylene tetrachloride (perchloroethylene)
I: anisole (methoxybenzene)
J: anisole and benzyl alcohol K: anisole and catechol
L: benzoic acid and ethanol
M: adipic acid and water
N: 2-naphthol and ethanol
O: catechol, phenol and methanol
P: trifluoroethanol Of the above mixtures, bonding of the polyamide sheets was obtained only with mixtures F, G, H, K, O and P, although minor amounts of softening and/or weak bonds were formed with some other mixtures. Mixture O gave the strongest bonds, although mixtures F, K and P also formed good bonds.

I claim:

1. A process for bonding a first polyamide article to a second polyamide article, comprising:
   (A) applying a homogeneous admixture formed from benzyl alcohol and a hydroxy benzene to at least one of said polyamide articles, said admixture being selected from the group consisting of:
      (i) a homogeneous admixture consisting essentially of:
         (a) 5 to 50% by weight of benzyl alcohol;
         (b) 20 to 90% by weight of phenol; and
         (c) 5 to 30% by weight of a polyamide; and
      (ii) a homogeneous admixture consisting essentially of:
         (a) 20 to 60% by weight of benzyl alcohol;
         (b) 20 to 60% by weight of ortho-dihydroxy benzene; and
         (c) 20 to 60% by weight of a lower alcohol having from one to four carbon atoms; and
   (B) bringing said first and second polyamide articles into contact.

2. The process of claim 1 in which the admixture consists essentially of:
   (a) 5 to 50% by weight of benzyl alcohol;
   (b) 20 to 90% by weight of phenol; and
   (c) 5 to 30% by weight of a polyamide.

3. The process of claim 1 in which the admixture consists essentially of:
   (a) 20 to 60% by weight of benzyl alcohol;
   (b) 20 to 60% by weight of ortho-dihydroxy benzene; and
   (c) 20 to 60% by weight of a lower alcohol having from one to four carbon atoms.

4. The process of claim 2 in which the polyamide is an aliphatic polyamide.

5. The process of claim 4 in which the amount of benzyl alcohol is 10 to 40% by weight, the amount of phenol is 40 to 80% by weight and the amount of aliphatic polyamide is 10 to 20% by weight.

6. The process of claim 5 in which the polyamide is polyhexamethylene adipamide.

7. The process of claim 3 in which the amount of benzyl alcohol is 25 to 50% by weight, the amount of ortho-hydroxy benzene is 25 to 50% by weight and the amount of methanol is 25 to 50% by weight.

8. The process of claim 4 followed by the step of (C) applying heat to said articles to effect bonding of the first polyamide article to the second polyamide article, the amount of heat being insufficient to raise the temperature to more than the melting point of the polyamide.

9. The process of claim 8 in which the amount of heat applied does not raise the temperature of the first or second polyamide article above a temperature that is 50° C. below the melting point of the polyamides of such articles.

10. The process of claim 8 in which amount of heat applied does not raise the temperature of the first or second polyamide article above 195° C.

11. The process of claim 8 in which the polyamide articles are in the form of film or sheet.

* * * * *